United States Patent
Naoi et al.

(10) Patent No.: US 9,005,814 B2
(45) Date of Patent: Apr. 14, 2015

(54) LITHIUM TITANATE CRYSTAL STRUCTURE, COMPOSITE OF LITHIUM TITANATE CRYSTAL STRUCTURE AND CARBON, METHOD OF PRODUCTION THEREOF, AND ELECTRODE AND ELECTROCHEMICAL ELEMENT EMPLOYING SAID COMPOSITE

(75) Inventors: Katsuhiko Naoi, Tokyo (JP); Wako Naoi, Tokyo (JP); Shuichi Ishimoto, Tokyo (JP); Kenji Tamamitsu, Tokyo (JP)

(73) Assignee: Nippon Chemi-Con Corporation, Tokyo (JP)

( * ) Notice: Subject to any disclaimer, the term of this patent is extended or adjusted under 35 U.S.C. 154(b) by 137 days.

(21) Appl. No.: 13/696,053

(22) PCT Filed: May 2, 2011

(86) PCT No.: PCT/JP2011/002530
§ 371 (c)(1),
(2), (4) Date: Jan. 8, 2013

(87) PCT Pub. No.: WO2011/138866
PCT Pub. Date: Nov. 10, 2011

(65) Prior Publication Data
US 2013/0115516 A1    May 9, 2013

(30) Foreign Application Priority Data
May 4, 2010    (JP) ................ 2010-106052

(51) Int. Cl.
*H01M 4/13*    (2010.01)
*H01M 4/485*    (2010.01)
(Continued)

(52) U.S. Cl.
CPC ............. *H01M 4/485* (2013.01); *B82Y 30/00* (2013.01); *B82Y 40/00* (2013.01); *C01B 31/0253* (2013.01);
(Continued)

(58) Field of Classification Search
CPC ...... H01G 9/035; H01M 4/131; H01M 4/364; H01M 4/366; H01M 4/485; H01M 4/587; H01M 4/505; Y02E 60/122; Y10S 977/773; Y10S 977/784; Y10S 977/811
USPC .......... 429/231.1, 231.2, 231.3, 231.4, 231.5, 429/231.6, 231.7, 231.8, 231.95
See application file for complete search history.

(56) References Cited

U.S. PATENT DOCUMENTS
2010/0025627 A1    2/2010    Naoi et al.

FOREIGN PATENT DOCUMENTS
JP    2007-160151    6/2007
JP    2008-270795    11/2008
WO    2007/066581    6/2007

OTHER PUBLICATIONS

Naoi, Katsuhiko et al., (High-rate nano-crystalline Li4Ti5O12 attached on carbon nano-fibers for hybrid supercapacitors, Journal of Power Sources, Jan. 13, 2010, vol. 195, pp. 6250-6254).*

(Continued)

Primary Examiner — Patrick Ryan
Assistant Examiner — Ben Lewis (57) ABSTRACT

Highly dispersed lithium titanate crystal structures having a thickness of few atomic layers level and the two-dimensional surface in a plate form are supported on carbon nanofiber (CNF). The lithium titanate crystal structure precursors and CNF that supports these are prepared by a mechanochemical reaction that applies sheer stress and centrifugal force to a reactant in a rotating reactor. The mass ratio between the lithium titanate crystal structure and carbon nanofiber is preferably between 75:25 and 85:15. The carbon nanofiber preferably has an external diameter of 10-30 nm and an external specific surface area of 150-350 cm²/g. This composite is mixed with a binder and then molded to obtain an electrode, and this electrode is employed for an electrochemical element.

12 Claims, 5 Drawing Sheets

(51) Int. Cl.
- *B82Y 30/00* (2011.01)
- *B82Y 40/00* (2011.01)
- *C01B 31/02* (2006.01)
- *C01G 23/00* (2006.01)
- *H01M 4/131* (2010.01)
- *H01M 4/36* (2006.01)
- *H01M 4/587* (2010.01)
- *H01G 9/035* (2006.01)
- *H01G 11/06* (2013.01)
- *H01G 11/50* (2013.01)
- *H01G 11/24* (2013.01)
- *H01G 11/30* (2013.01)
- *H01G 11/36* (2013.01)

(52) U.S. Cl.
CPC ............ *C01G 23/005* (2013.01); *C01P 2004/03* (2013.01); *C01P 2004/04* (2013.01); *C01P 2004/64* (2013.01); *C01P 2006/12* (2013.01); *C01P 2006/40* (2013.01); *H01G 11/36* (2013.01); *H01M 4/131* (2013.01); *H01M 4/364* (2013.01); *H01M 4/587* (2013.01); *H01G 9/035* (2013.01); *H01M 4/366* (2013.01); *Y10S 977/773* (2013.01); *Y10S 977/784* (2013.01); *Y10S 977/811* (2013.01); *Y10S 977/892* (2013.01); *Y10S 977/896* (2013.01); *H01G 11/06* (2013.01); *H01G 11/50* (2013.01); *Y02E 60/122* (2013.01); *Y02E 60/13* (2013.01); *H01G 11/24* (2013.01); *H01G 11/30* (2013.01)

(56) References Cited

OTHER PUBLICATIONS

Naoi, Katsuhiko et al., High-rate nano-crystalline Li4Ti5O12 attached on carbon nano-fibers for hybrid supercapacitors, Journal of Power Sources, Jan. 13, 2010, vol. 195, pp. 6250-6254.

* cited by examiner

LITHIUM TITANATE CRYSTAL STRUCTURE, COMPOSITE OF LITHIUM TITANATE CRYSTAL STRUCTURE AND CARBON, METHOD OF PRODUCTION THEREOF, AND ELECTRODE AND ELECTROCHEMICAL ELEMENT EMPLOYING SAID COMPOSITE

TECHNICAL FIELD

The present invention relates to a lithium titanate crystal structure, a composite of lithium titanate crystal structure and carbon, a method of production thereof, and an electrode and an electrochemical element that employ this composite.

BACKGROUND ART

A carbon material etc. that stores and releases lithium is currently used as the electrode for lithium batteries, but there is a risk of decomposition of the electrolytic solution since the negative electrode potential is lower than the reductive decomposition potential of the electrolytic solution. Accordingly, as described in Patent Documents 1 or 2, the use of lithium titanate having lower negative electrode potential than the reductive decomposition potential of the electrolytic solution is being investigated, but lithium titanate has a problem of low output property. Accordingly, attempts are being made to improve output property by an electrode in which lithium titanate is made into nanoparticles and supported on carbon.

Patent Document 1: Japanese Patent Application Laid-open No. 2007-160151

Patent Document 2: Japanese Patent Application Laid-open No. 2008-270795

The inventions described in these Patent Documents are methods for applying sheer stress and centrifugal force to a reactant in a rotating reactor to allow promotion of chemical reaction (generally referred to as mechanochemical reaction), thereby yielding dispersed lithium titanate supported on carbon. In this case, for example, titanium alkoxide and lithium acetate which are the starting materials of lithium titanate, a carbon such as carbon nanotube or carbon black, and acetic acid etc. are used as reactants.

Although the electrodes that use carbon supporting lithium titanate crystal structures described in these Patent Documents exert superior output property, there are recent demands to further improve the output property and to improve the electric conductivity in this type of electrode.

SUMMARY OF THE INVENTION

The present invention is proposed to solve the problems of the conventional technology as stated above, the object of which is to provide a lithium titanate crystal structure that can yield an electrode and an electrochemical element that enables improvement of output property and electric conductivity, a composite of lithium titanate crystal structure and carbon, as well as a method of production thereof. In addition, another object of the present invention is to provide an electrode and an electrochemical element that employ said composite.

The lithium titanate crystal structure of the present invention is characterized in having a thickness of 2-5 atomic layers level, and having one side of the two-dimensional surface spread in a plate form at 5-100 nm. In particular, since its two-dimensional surface is a (111) face, and the lithium titanate crystal structure of the present invention is also an ultra thin film structure having a thickness of 1 nm or less at 2-5 atomic layers level, it is desirable that the ratio between the thickness and one side of the two-dimensional surface is between 1:5 and 1:350 and the two-dimensional surface is spread in a plate form. This lithium titanate crystal structure can be produced by applying sheer stress and centrifugal force to a solution comprising a titanium source and a lithium source to allow reaction and producing a lithium titanate crystal structure precursor, and heating this precursor to obtain a plate crystal structure having a thickness of few atomic layers level.

The composite of lithium titanate crystal structure and carbon of the present invention is characterized in that the dispersed lithium titanate crystal structure is supported on carbon nanofiber (hereinafter referred to as CNF). In this case, it is preferred that the ratio between the lithium titanate crystal structure and carbon is between 75:25 and 85:15, in particular 80:20. In addition, the CNF preferably has an external diameter of 10-30 nm and an external specific surface area of 150-350 $cm^2/g$. This composite can be produced by applying sheer stress and centrifugal force to a solution comprising a titanium source, a lithium source, and carbon nanofiber in amounts so that the mass ratio between the lithium titanate crystal structure and carbon nanofiber of the composite produced is between 75:25 and 85:15 to allow reaction and producing a composite of lithium titanate crystal structure precursors and carbon nanofiber, and heating this composite.

Further, the lithium titanate crystal structure as described above, a method of producing a composite of lithium titanate crystal structure and carbon, as well as an electrode and an electrochemical element that employ said composite are also encompassed in the present invention.

According to the present invention, since the lithium titanate crystal structure is an ultra thin film structure having a thickness of 2-5 atomic layers level, it has extremely thin thickness and the surface area per volume is extremely large, and the exposure of lithium atoms that configure the crystal structure is large. Consequently, the absorption and desorption sites of lithium per electrode volume (surface area) will become close to infinity, and thus allows high capacitance and good rate property. When this crystal structure is used for an electrode or an electrochemical element, the transfer of electrons or ions will be facilitated, enabling improvement of electric conductivity.

DESCRIPTION OF EMBODIMENTS

Embodiments for implementing the present invention will now be described.

Mechanochemical Reaction

The reaction method employed in the present invention is a mechanochemical reaction similar to the method shown in Patent Documents 1 and 2 previously filed for patent application by the present inventors, wherein sheer stress and centrifugal force are applied to a reactant in a rotating reactor during chemical reaction to allow promotion of the chemical reaction.

Figure 5:
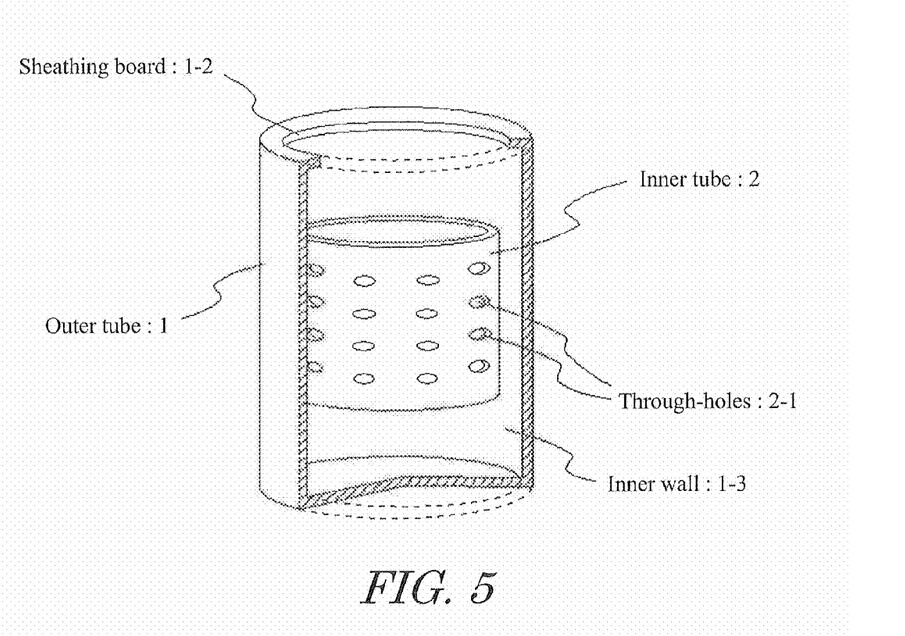
FIG. 5 is a perspective view showing an example of the reactor used in the production method of the present invention.

This reaction method can be performed by employing for example the reactor as shown in FIG. 5. As shown in FIG. 5, the reactor consists of an outer tube 1 having a sheathing board 1-2 at the opening and a rotating inner tube 2 having through-holes 2-1. By introducing the reactant into the inner tube of this reactor and rotating the inner tube, the reactant inside the inner tube is transferred through the through-holes of the inner tube to the inner wall 1-3 of the outer tube by its centrifugal force. At this time, the reactant collides with the inner wall of the outer tube by the centrifugal force of the inner tube, and slides up to the upper portion of the inner wall in a thin film state. In this state, the sheer stress with the inner wall and the centrifugal force from the inner tube are both simultaneously applied to the reactant, and a large mechanical energy is thereby applied to the thin film reactant. This mechanical energy is thought to be converted into chemical energy necessary for reaction, the so-called activation energy, and the reaction is progressed in a short period of time.

In this reaction, since the mechanical energy applied to the reactant will be large when in a thin film state, the thickness of the thin film is 5 mm or less, preferably 2.5 mm or less, and further preferably 1.0 mm or less. The thickness of the thin film can be set by the width of the sheathing board and the amount of the reaction solution.

It is thought that this reaction method can be realized by the mechanical energy of sheer stress and centrifugal force applied to the reactant, and this sheer stress and centrifugal force are generated by the centrifugal force applied to the reactant inside the inner tube. Accordingly, the centrifugal force applied to the reactant inside the inner tube necessary for the present invention is 1500 N (kgms$^{-2}$) or higher, preferably 60000 N (kgms$^{-2}$) or higher, and further preferably 270000 N (kgms$^{-2}$) or higher.

In this reaction method, it is thought that chemical reaction can be promoted at a nonconventional speed due to the fact that the mechanical energies of both sheer stress and centrifugal force are simultaneously applied to the reactant, and this energy is thereby converted into chemical energy.

Lithium Titanate Crystal Structure

For the lithium titanate crystal structures according to the present invention, for example, a titanium source such as titanium alkoxide, and a lithium source such as lithium acetate, lithium nitrate, lithium carbonate, and lithium hydroxide are used as starting materials, and lithium titanate crystal structure precursors are produced by said mechanochemical reaction. In the Examples of the present invention, the lithium titanate crystal structure having oxygen defect sites doped with nitrogen are produced by heating these lithium titanate crystal structure precursors under nitrogen atmosphere.

Carbon

By adding CNF in the reaction process, a composite of 5-100 nm lithium titanate crystal structure and carbon can be obtained. In other words, said titanium source and lithium source, a reaction suppressor, and a given amount of CNF are introduced into the inner tube of the reactor, and the inner tube is rotated to mix and disperse the metal salt and the reaction suppressor and CNF. A catalyst such as sodium hydroxide is further introduced while rotating the inner tube to advance hydrolysis and condensation reaction to produce lithium titanate, and this lithium titanate and carbon are mixed in a dispersed state. Carbon supporting highly dispersed lithium titanate crystal structures can be formed by rapidly heating this at the end of the reaction.

The carbon employed here is preferably CNF. CNF has a hollow configuration as well as a small interior surface and a large diameter, and thus when lithium titanate crystal structures are supported thereon, the amount of lithium titanate crystal structures included in CNF will be small, and the amount supported on the exterior surface of CNF will be large. In addition, since CNF has a large diameter, that is to say, has "a small specific surface area (external specific surface area)", the supported lithium titanate particles will grow outwards along the surface of CNF and crystallize to become a sheet form under the mechanochemical reaction as described above.

Carbon nanotubes (hereinafter referred to as CNT) are hollow, and are not suitable for the present invention because lithium titanate crystal structures are included in a tubular CNT. In other words, the external specific surface area of CNF shown in the Examples of the present invention (multi-layered CNT with large diameter) is 150-350 cm$^2$/g, the specific surface area of a general multi-layered CNT is 200 to 400 cm$^2$/g, the specific surface area of a mono-layered CNT is 400-500 cm$^2$/g, SGCNT (super-growth carbon nanotube) is at 600-1100 cm$^2$/g, and Ketjen Black is at 600-800 cm$^2$/g.

In order to allow support of a large amount of lithium titanate crystal structures on carbon, it is preferred that the external specific surface area of carbon is in the range of 150-350 cm$^2$/g. CNF having such external specific surface area preferably has an external diameter of 10-30 nm. When the external diameter is smaller than this range, the external specific surface area will become large and it will be difficult for lithium titanate crystal structures to grow outwards. When the external diameter is larger than this range, the external specific surface area will become small and it will be difficult to support lithium titanate crystal structures of 75/25 (w/w) or higher.

Amounts of Lithium Titanate Crystal Structures and Carbon

The proportion of the lithium titanate crystal structure and carbon in the composite is between 75:25 and 85:15. In particular, the proportion of the lithium titanate crystal structure is larger in this proportion compared to the conventionally proposed 70:30, and thus it helps the lithium titanate to grow in a sheet form towards the circumferential direction of the reactor under the mechanochemical reaction. In addition, since the meaning of this range in a critical sense is determined by the capacitance per electrode, a large electrode capacitance can be obtained at this range.

Solvent

Alcohols, water, or a mixed solvent thereof can be employed as the solvent. For example, a mixed solvent of acetic acid and lithium acetate dissolved in a mixture of isopropanol and water can be used.

Reaction Suppressor

When titanium alkoxide is used as the starting material, as described in Patent Document 2, a given compound that forms a complex with a given titanium alkoxide can be added as the reaction suppressor, wherein said mechanochemical reaction is applied to the titanium alkoxide. This can suppress the chemical reaction from being excessively promoted.

In other words, the reaction can be suppressed by adding to the titanium alkoxide 1 to 3 moles of a given compound such as acetic acid that forms a complex therewith (relative to 1 mole of titanium alkoxide) to form a complex. Composite nanoparticles of lithium and titanium oxide which are crystal structure precursors of lithium titanate are produced by this reaction, and lithium titanate crystal structures are obtained by calcination thereof.

As stated above, it is thought that the chemical reaction can be suppressed from being excessively promoted by adding a given compound such as acetic acid as the reaction suppressor because a given compound such as acetic acid forms a stable complex with titanium alkoxide.

A material that can form a complex with titanium alkoxide includes a complexing agent represented by acetic acid, as well as a carboxylic acid such as citric acid, oxalic acid, formic acid, lactic acid, tartaric acid, fumaric acid, succinic acid, propionic acid, and levulinic acid, an amino polycarboxylic acid such as EDTA, and an aminoalcohol such as triethanolamine.

Heating

The present invention yields a composite that supports lithium titanate crystal structure precursors inside carbon nanoparticle structures by a mechanochemical reaction, allows promotion of crystallization of lithium titanate by heating this composite of lithium titanate crystal structure and carbon, and improves the capacitance and output property of an electrode or an electrochemical element that uses this composite.

In other words, since the obtained lithium titanate crystal structure precursors and CNF have "a small specific surface area", the supported lithium titanate crystal structures grow outwards to become a sheet form. The said heating temperature is 700° C.-900° C., wherein good crystallization progress cannot be attained at below this temperature, and lithium titanate having good energy storage property cannot be obtained due to phase transition at over this temperature. In the Examples of the present invention, superior electrical property was obtained by heating at 700° C.

In the present invention, said heating is preferably performed under nitrogen atmosphere. In other words, it is thought that by heating lithium titanate under nitrogen atmosphere, oxygen defects are generated in its crystal structure, and capacitance and output property are improved in an electrode or an electrochemical element that employs this composite by occlusion and desorption of lithium occurring at these sites. In addition, it is thought that these oxygen defect sites are doped with nitrogen thereby improving the electric conductivity of lithium titanate and improving the output property.

Electrode

The composite of lithium titanate crystal structure and carbon obtained by the present invention can be mixed and kneaded with a binder, molded, and made into the electrode of an electrochemical element, i.e. electric energy storage electrode. This electrode shows high output property and high capacitance property.

Electrochemical Element

An electrochemical element that can employ this electrode is an electrochemical capacitor or battery that employs an electrolytic solution containing metal ions such as lithium or magnesium. In other words, the electrode of the present invention can occlude and detach metal ions, and works as a negative electrode or positive electrode. Accordingly, an electrochemical capacitor or battery can be configured by employing an electrolytic solution containing lithium ions, and employing as the counter electrode for example activated carbon as well as carbon or metal oxide which occludes and detaches lithium ions.

EXAMPLES

The present invention will now be further specifically described by Examples.

Example 1

Acetic acid and lithium acetate in amounts of 1.8 moles of acetic acid and 1 mole of lithium acetate relative to 1 mole of titanium alkoxide were dissolved in a mixture of isopropanol and water to prepare a mixed solvent. This mixed solvent together with titanium alkoxide and CNF were introduced into a rotary reactor, the inner tube was rotated at a centrifugal force of 66000 N ($kgms^{-2}$) for 5 minutes to form a thin film of the reactant on the inner wall of the outer tube, and sheer stress and centrifugal force were applied to the reactant to allow promotion of chemical reaction, yielding CNF supporting highly dispersed lithium titanate crystal structure precursors. In this case, the amounts of titanium alkoxide and CNF dissolved in the mixed solvent were set so that the composition of the composite obtained was lithium titanate/CNF at a mass ratio (w/w) of 80/20.

By drying the obtained CNF supporting highly dispersed lithium titanate crystal structure precursors under vacuum at 80° C. for 17 hours, a composite powder in which highly dispersed lithium titanate crystal structure precursors are supported on CNF was obtained.

The obtained composite powder in which highly dispersed lithium titanate crystal structure precursors are supported on CNF was heated under nitrogen atmosphere at 700° C. to allow progression of crystallization of titanium oxide containing lithium, and a composite powder in which highly dispersed crystal structures of plate-form lithium titanate nanoparticles are supported on CNF was obtained.

Figure 1:
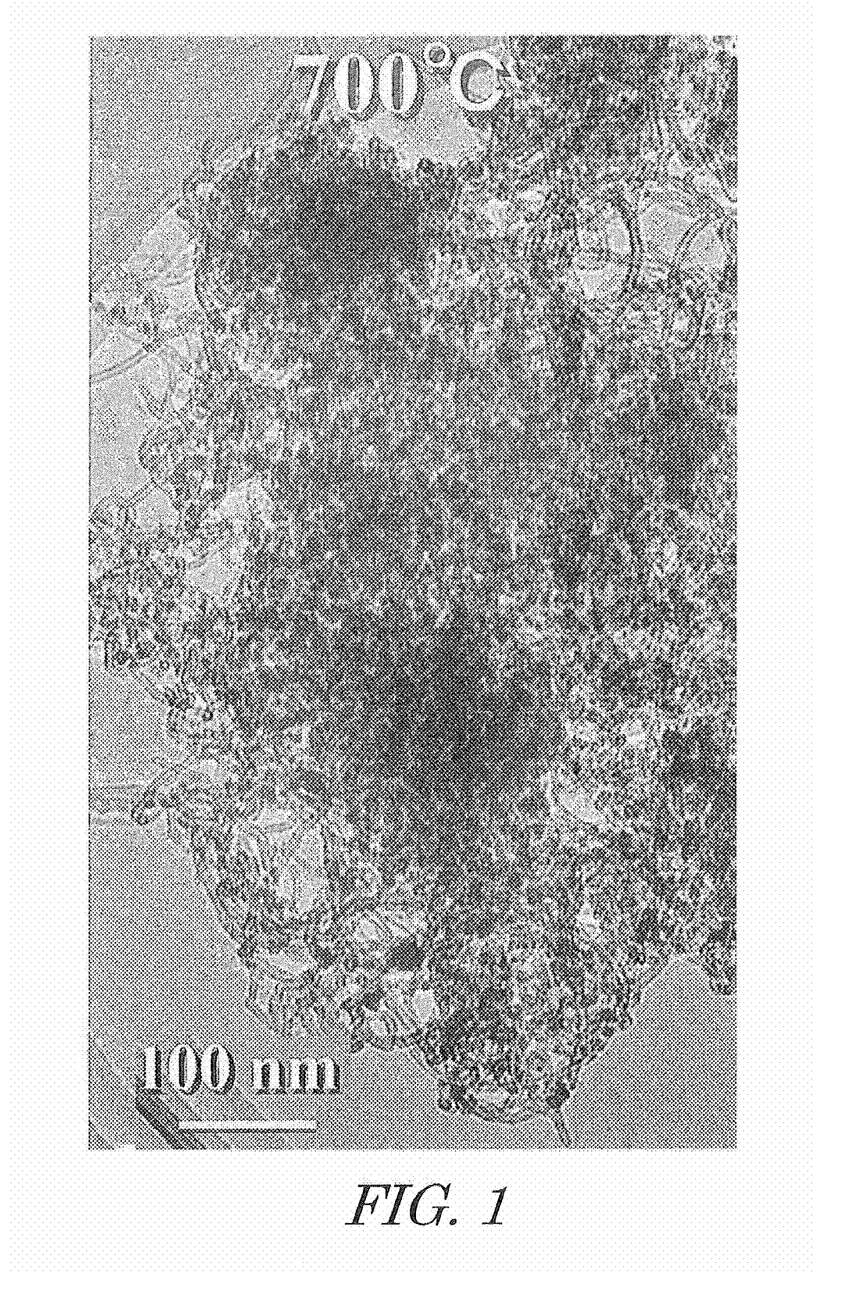
FIG. 1 is a photographic as a substitute for drawing which shows the TEM image of the composite of lithium titanate crystal structure and carbon of Example 1.

The TEM image of the respective CNFs supporting lithium titanate crystal structures of Example 1 is shown in FIG. 1. In FIG. 1, it is seen that highly dispersed 5 nm-20 nm lithium titanate crystal structures are supported on CNF.

In particular, as seen in the TEM image of FIG. 1, "the composite of lithium titanate crystal structure and carbon" of this Example takes form of a "building structure for graphite fragment" of CNF connected together, and highly dispersed lithium titanate crystal structures are supported on this structure.

Figure 2:
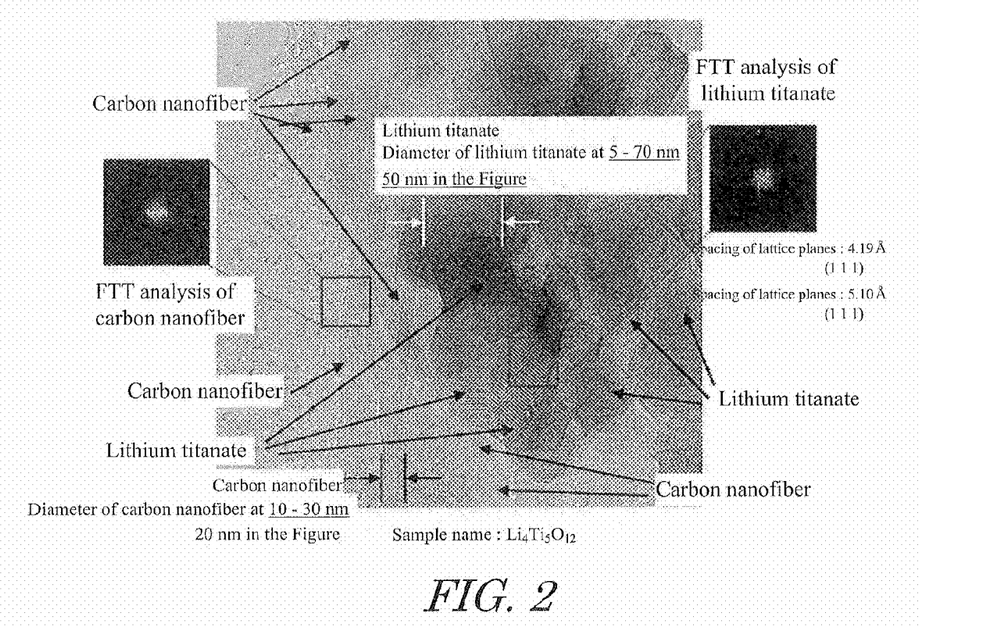
FIG. 2 is a photographic as a substitute for drawing which shows the magnified TEM image of the composite of lithium titanate crystal structure and carbon of Example 1 and the result of FET analysis.
Figure 3:
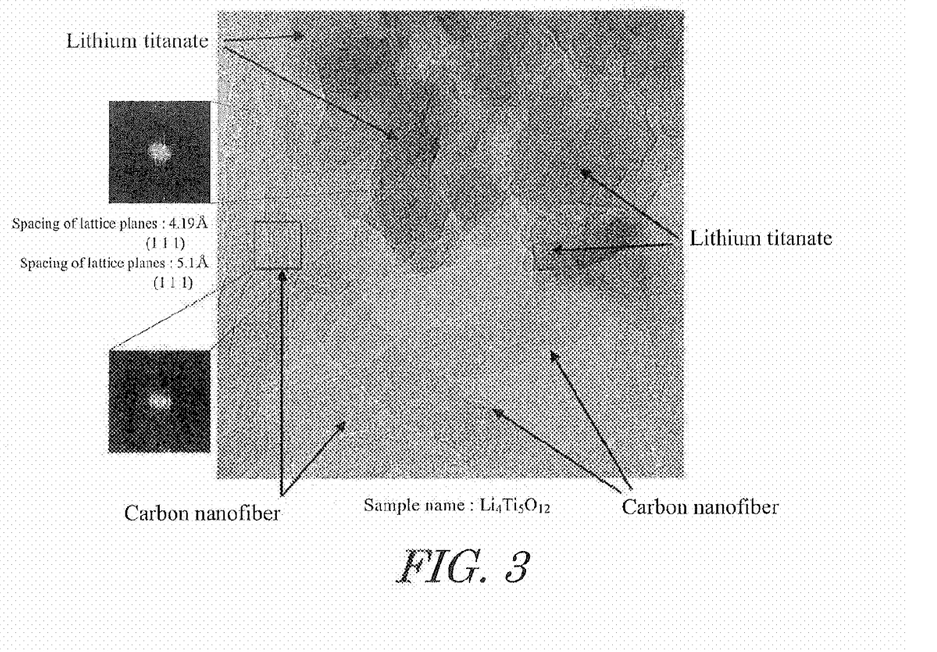
FIG. 3 is a photographic as a substitute for drawing which shows the magnified TEM image of another portion of the composite of lithium titanate crystal structure and carbon of Example 1 and the result of FET analysis.
Figure 4:
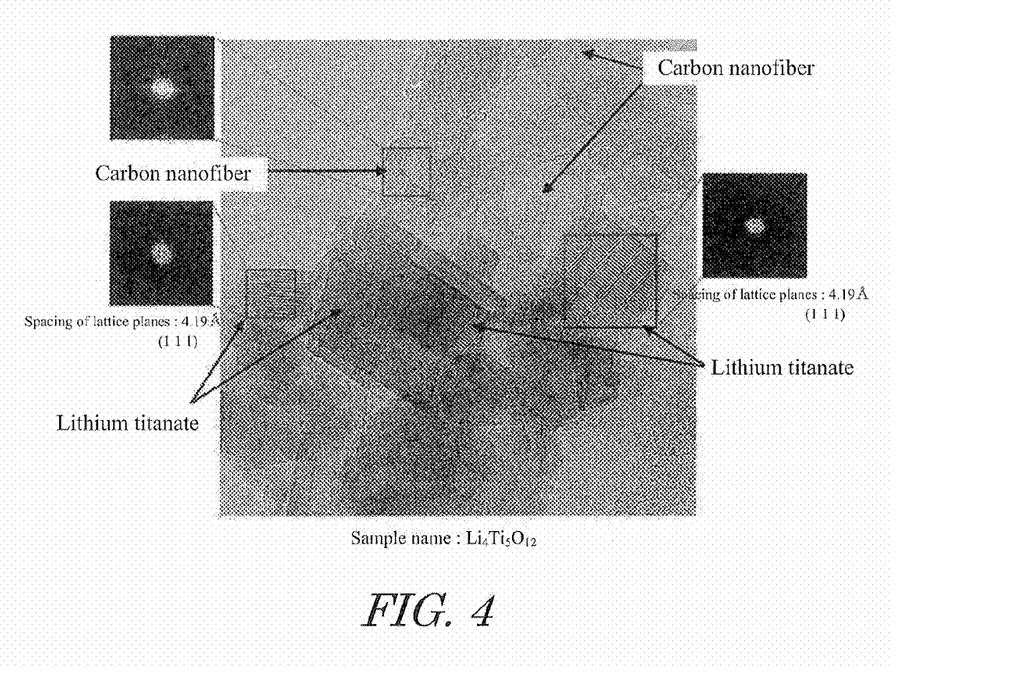
FIG. 4 is a photographic as a substitute for drawing which shows the magnified TEM image of another portion of the composite of lithium titanate crystal structure and carbon of Example 1 and the result of FET analysis.

FIGS. 2 to 4 show the CNF supporting highly dispersed lithium titanate precursors of Example 1 observed with a high resolution TEM. In other words, the portion where lithium titanate is supported on (attached to) carbon nanofiber was magnified and photographed. Numerous parallel lines that appear in the figures show the crystal lattice. In addition, spacing of lattice planes: 4.91 Å (1 1 1) and spacing of lattice planes: 5.10 Å (1 1 1) mean that the lithium titanate sheet surface of the TEM photograph taken is the (111) face of the crystal, and the spacing of lattice planes shows that two crystals exist.

As seen from FIGS. 2 to 4, the lithium titanate crystal structures have an ultra thin film structure. This ultra thin film structure has a thickness of 1 nm or less at 2-5 atomic layers level, and one side of the two-dimensional surface is in a plate form at 5-100 nm. In addition, the two-dimensional surface is a (111) face. Further, most of the lithium titanate crystal structures have a ratio between the thickness and one side of the two-dimensional surface in the range of between 1:5 and 1:350.

Such ultra thin film structure has extremely thin thickness, and the surface area per volume is extremely large. Accordingly, it can show high output property. In regards to the surface area per volume, the surface area of an ultra thin film structure having a thickness infinitely close to zero is the largest, and the lithium titanate crystal structure of this Example has a structure having a thickness of few atomic layers level close to such ultra thin film structure.

The above ultra thin film structure is thought to be formed by applying sheer stress and centrifugal force to a solution comprising the starting material of lithium titanate and CNF powder in a rotating reactor to allow reaction, and then subjecting to heating treatment.

Example 2

A composite powder of lithium titanate crystal structures and CNF was prepared as in the above Example, except that the amounts of titanium alkoxide and CNF dissolved in the mixed solution were varied so that the compounding ratio between the lithium titanate crystal structure and CNF obtained was 75/25.

Example 3

A composite powder of lithium titanate crystal structures and CNF was prepared as in the above Example, except that the amounts of titanium alkoxide and CNF dissolved in the mixed solution were varied so that the compounding ratio between the lithium titanate crystal structure and CNF obtained was 85/15.

Comparative Example 1

A composite powder of lithium titanate crystal structures and CNF was prepared as in the above Example, except that the amounts of titanium alkoxide and CNF dissolved in the mixed solution were varied so that the compounding ratio between the lithium titanate crystal structure and CNF obtained was 70/30.

The composite powder obtained in Example 1 and Comparative Example 1 configured as above was introduced into a SUS mesh welded onto a SUS plate together with polyvinylidene fluoride PVDF as the binder ($Li_4Ti_5O_{12}$/CNF/PVDF 56:24:20). This was set as the working electrode W.E. A separator as well as the counter electrode C.E. and Li foil as the reference electrode were placed on said electrode, and 1.0 M lithium tetrafluoroborate ($LiBF_4$)/ethylene carbonate EC:dimethyl carbonate DEC (1:1 w/w) was impregnated as the electrolytic solution to yield a cell.

Further, for a cell having an electrode that employs the composite powder of Examples 1 to 3 and Comparative Example 1, the result of comparing the capacitance calculated from the charge and discharge behavior thereof is as follows.

(1) Example 1 $Li_4Ti_5O_{12}$:CNF=80:20, capacitance: 131 mAh/g (2) Example 2 $Li_4Ti_5O_{12}$:CNF=75:25, capacitance: 125 mAh/g (3) Example 3 $Li_4Ti_5O_{12}$:CNF=85:15, capacitance: 137 mAh/g (4) Comparative Example 1 $Li_4Ti_5O_{12}$:CNF=70:30, capacitance: 118 mAh/g As apparent from this result, it was confirmed that when the composite of this Example having a mass ratio between the lithium titanate crystal structure and carbon nanofiber at between 75:25 and 85:15 was used, capacitance was increased compared to the Comparative Example. The output property was also good.

Example 4

Nine parts by weight of the composite powder of Example 1 and 1 part by weight of PVDF (polyvinylidene fluoride) binder were mixed and kneaded, and rolled to form a sheet. After vacuum drying, this sheet was junctured to a copper foil as the negative electrode.

In addition, 8 parts by weight of activated carbon (available from Kuraray Chemical Co., Ltd., RD-20) 1 part by weight of PTFE binder (polytetrafluoroethylene), and 1 part by weight of acetylene black as the conductive material were mixed and kneaded, and rolled to form a sheet. After vacuum drying, this sheet was junctured to an aluminum foil as the positive electrode.

These electrodes were placed facing each other via a cellulose-based separator in a beaker filled with $LiBF_4$ and propylene carbonate solution to prepare a hybrid capacitor cell.

Example 5

A hybrid capacitor cell was similarly prepared by employing the composite powder of Example 2.

Example 6

A hybrid capacitor cell was similarly prepared by employing the composite powder of Example 3.

Comparative Example 2

A hybrid capacitor cell was similarly prepared by employing the composite powder of Comparative Example 1.

The capacitance of these hybrid capacitor cells was measured. The result was the capacitance of Examples 4 to 6 at 29.4 mAh/g, 29.0 mAh/g, 29.8 mAh/g, and 28.4 mAh/g, respectively, showing large capacitance compared to Comparative Example 2 at 28.4 mAh/g, as well as showing that the hybrid capacitor cells of the present application have good property.

The invention claimed is:

1. A composite of lithium titanate crystal structure and carbon, wherein
the lithium titanate crystal structure having a thickness of 1 nm or less at 2-5 atomic layers level and having one side of the two-dimensional surface spread in a plate form at 5-100 nm,
the dispersed lithium titanate crystal structure is supported on carbon nanofiber, the mass ratio between the lithium titanate crystal structure and carbon nanofiber is between 75:25 and 85:15.

2. The composite of lithium titanate crystal structure and carbon according to claim 1, wherein the two-dimensional surface is a (111) face.

3. The composite of lithium titanate crystal structure and carbon according to claim 2, having a plate crystal structure with a thickness of few atomic layers level obtained by applying sheer stress and centrifugal force are to a solution comprising a titanium source and a lithium source to allow reaction and producing a lithium titanate crystal structure precursor, and heating this precursor.

4. The composite of lithium titanate crystal structure and carbon according to claim 1, wherein the ratio between the thickness and one side of the two-dimensional surface is between 1:5 and 1:350.

5. The composite of lithium titanate crystal structure and carbon according to claim 4, having a plate crystal structure with a thickness of few atomic layers level obtained by applying sheer stress and centrifugal force are to a solution comprising a titanium source and a lithium source to allow reaction and producing a lithium titanate crystal structure precursor, and heating this precursor.

6. The composite of lithium titanate crystal structure and carbon according to claim 1, having a plate crystal structure with a thickness of few atomic layers level obtained by applying sheer stress and centrifugal force are to a solution comprising a titanium source and a lithium source to allow reaction and producing a lithium titanate crystal structure precursor, and heating this precursor.

7. The composite of lithium titanate crystal structure and carbon according to claim 1, wherein said carbon nanofiber has an external diameter of 10-30 nm and an external specific surface area of 150-350 $cm^2/g$.

8. The composite of lithium titanate crystal structure and carbon according to claim 1, wherein sheer stress and centrifugal force are applied to a solution comprising a titanium source, a lithium source, and carbon nanofiber in amounts so that the mass ratio between the lithium titanate crystal structure and carbon nanofiber of the composite produced is between 75:25 and 85:15 in a rotating reactor to allow reaction and producing a composite of lithium titanate crystal structure precursors and carbon nanofiber, and heating this composite to obtain a plate lithium titanate crystal structure with a thickness of few atomic layers level supported on carbon nanofiber.

9. An electrode obtained by mixing the composite according to claim 1 with a binder and then molding.

10. An electrochemical element that employs the electrode according to claim 1.

11. An electrochemical capacitor that employs the electrode according to claim 9 as a negative electrode and a polarizable electrode as a positive electrode.

12. A method for producing a composite of lithium titanate crystal structure and carbon nanofiber, in which sheer stress and centrifugal force is applied to a solution comprising a titanium source, a lithium source, and carbon nanofiber in amounts so that the mass ratio between the lithium titanate crystal structure and carbon nanofiber of the composite produced is between 75:25 and 85:15 in a rotating reactor to allow reaction and producing a composite of lithium titanate crystal structure precursors and carbon nanofiber, and a composite of this precursor and carbon nanofiber are heated to produce a composite of plate lithium titanate crystal structure and carbon nanofiber having a thickness of few atomic layers level.

* * * * *